United States Patent [19]

Remick et al.

[11] Patent Number: 4,925,745

[45] Date of Patent: May 15, 1990

[54] SULFUR TOLERANT MOLTEN CARBONATE FUEL CELL ANODE AND PROCESS

[75] Inventors: Robert j. Remick, Naperville, Ill.

[73] Assignee: Institute of Gas Technoloy, Chicago, Ill.

[21] Appl. No.: 717,447

[22] Filed: Mar. 29, 1985

[51] Int. Cl.$^5$ .................. H01M 8/14; H01M 8/18
[52] U.S. Cl. ................................ 429/40; 429/16; 429/19; 429/17; 502/315
[58] Field of Search ............... 429/16, 17, 19, 40; 502/315

[56] References Cited

U.S. PATENT DOCUMENTS

| | | | |
|---|---|---|---|
| 3,393,100 | 7/1968 | Niedrach | 429/17 |
| 3,431,146 | 3/1969 | Truitt . | |
| 3,453,146 | 7/1969 | Bawa et al. | 429/17 |
| 3,453,314 | 7/1969 | Smeykal | 502/315 X |
| 3,853,922 | 12/1974 | Yamaguchi et al. | 502/315 X |
| 4,009,321 | 2/1977 | Baker et al. . | |
| 4,247,604 | 1/1981 | Marianowski et al. | 429/46 X |
| 4,548,876 | 10/1985 | Bregoli | 429/40 X |

FOREIGN PATENT DOCUMENTS 111052  6/1984  European Pat. Off. .............. 429/16

OTHER PUBLICATIONS

An Update of the Sulfur Tolerance of Molten Carbonate Fuel Cells, L. G. Marianowski, presented at Third Annual Contractors Meeting on Contaminant Control in Hot Coal Derived Gas Streams, May 23-26, 1983.
Effects of Sulfur on Molten Carbonate Fuel Cells, S. W. Smith, H. R. Kunz, W. M. Vogel, S. J. Szymanski, United Technologies Corporation, Power Systems Division Montreal, Canada, May 1982.
Development of Molten Carbonate Fuel Cell Power Plant Technology, DOE/ET/15440-8 Quarterly Technical Progress Report No. 8, for Department of Energy, Feb., 1983.
The Effect of Sulfur on the Anodic $H_2$ (Ni) Electrode in Fused $Li_2CO_3$-$K_2CO_3$ at 650° C., W. M. Vogel and S. W. Smith, J. Electrochem. Soc. 129 (7) 1441-1445 (1982).
Effects of Sulfur-Containing Gases on the Performance of Molten Carbonate Fuel Cells, T. E. Tank, T. D. Claar, and L. G. Marianowski, Interim Report EM-1699 prepared for Electric Power Research Institute by Institute of Gas Technology, Feb. 1981.
Development of Sulfur-Tolerant Components for the Molten Carbonate Fuel Cells, A. F. Sammels, S. B. Nicholson and P. G. P. Ang, J. Electrochem. Soc. 127, 350 (1980).
Development of Sulfur-Tolerant Components for Second-Generation Molten Carbonate Fuel Cells, T. D. Claar, L. G. Marianowski and A. F. Sammels, Interim Report EM-1114, prepared for the Electric Power Research Institute by Institute of Gas Technology, Jul., 1979.

Primary Examiner—Stephen J. Kalafut
Attorney, Agent, or Firm—Thomas W. Speckman

[57] ABSTRACT

Molten carbonate fuel cell anodes incorporating a sulfur tolerant carbon monoxide to hydrogen water-gas-shift catalyst provide in situ conversion of carbon monoxide to hydrogen for improved fuel cell operation using fuel gas mixtures of over about 10 volume percent carbon monoxide and up to about 10 ppm hydrogen sulfide.

20 Claims, No Drawings

SULFUR TOLERANT MOLTEN CARBONATE FUEL CELL ANODE AND PROCESS

The U. S. Government has a paid-up license in this invention and the right in limited circumstances to require the patent owner to license others on reasonable terms as provided for by the terms of contract No. DE-AC21-83MC 20212 awarded by U.S. Department of Energy.

BACKGROUND OF THE INVENTION

1. Field of the Invention

This invention relates to molten carbonate fuel cell anodes incorporating a sulfur tolerant carbon monoxide to hydrogen water-gas-shift catalyst and a process for improved molten carbonate fuel cell operation using fuel gas mixtures of over 10 volume percent carbon monoxide. The anodes and process of this invention are particularly suitable when using synthetic gas as a fuel, which gas frequently contains sulfur containing chemicals such as hydrogen sulfide.

2. Description of the Prior Art

The use of molten carbonate fuel cells is well known for the conversion of chemical energy directly into electrical energy by a galvanic oxidation process. Molten carbonate fuel cells generally comprise two electrodes with their current collectors, a cathode and an anode, an electrolyte tile making contact with both of the electrodes and a cell housing to physically retain the cell components. Under fuel cell operating conditions, generally about 500° to about 700° C., the entire electrolyte tile, the carbonate and the inert support material, forms a paste and thus the electrolyte diaphragms of this type are known as "paste electrolytes". The electrolyte is in direct contact with the electrode where the three-phase, gas-electrolyte-electrode, reactions take place. At temperatures below about 650° C. hydrogen is essentially the only electrochemically active material and is consumed in the anode zone according to the reaction:

$$CO_3^= + H_2 \rightarrow H_2O + CO_2 + 2e^-$$

The electrons flow to the cathode through an external circuit producing the desired current flow and electrical balance. The carbonate ions are produced in the cathode zone by the reaction:

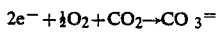

$$2e^- + \tfrac{1}{2}O_2 + CO_2 \rightarrow CO_3^=$$

The carbonate ions are transferred through the electrolyte to the anode zone. At temperatures above about 750° C. carbon monoxide becomes electrochemically active in the anode zone. Further details of construction and operation of high temperature carbonate fuel cells is set forth in U.S. Pat. Nos. 4,009,321 and 4,247,604 and the references referred to therein, all incorporated herein by reference.

One desirably used fuel for molten carbonate fuel cells is a mixture of gases comprising principally hydrogen, carbon dioxide, and carbon monoxide as obtained by gasification of naturally occurring carbonaceous material such as coal, shale or peat, as well known in the art. Gas mixtures obtained by these processes usually contain sulfur contaminants, such as hydrogen sulfide. Thus, when such gaseous fuel mixtures are supplied to the fuel zone of a molten carbonate fuel cell operated at below about 650° C. and the fuel mixture comprises typically 10 to 35 volume percent carbon monoxide, representing up to about 50 percent of the fuel content of the fuel gas, low fuel utilization is obtained with only hydrogen being electrochemically active in the molten carbonate fuel cell under such conditions. The initial carbon monoxide to hydrogen water-gas-shift catalytic activity of a conventional nickel molten carbonate fuel cell anode for production of additional hydrogen is quickly poisoned by the presence of sulfur containing chemicals. Smith, S. W., Kunz, H. R., Vogel, W. M. and Szymanski, S. J., "Effects of Sulfur on Molten Carbonate Fuel Cells", (paper presented at Electrochemical Society Meeting, Montreal, Canada, May 1982), have reported complete failure of cell voltage in a molten carbonate fuel cell with a nickel anode when 2 ppm hydrogen sulfide, on a volume basis, was present in the fuel gas. The reduction in molten carbonate fuel cell performance to unsatisfactory levels with the presence of very small amounts of hydrogen sulfide in the fuel gas has been reported by several investigators: United Technologies Corporation, "Development of Molten Carbonate Fuel Cell Power Plant Technology", DOE/ET/15440-8 Quarterly Technical Progress Report No. 8, prepared for Department of Energy, under contract No. DE-AC01-79ET15440, February 1983; Vogel, W. M. and Smith, S. W., "The Effect of Sulfur on the Anodic $H_2$ (Ni) Electrode in Fused $Li_2CO_3$-$K_2CO_3$ at 650° C.", J. Electrochem. Soc. 129 (7) 1441-45 (1982); Tang, T. E., Claar, T. D., and Marianowski, L. G., "Effects of Sulfur-Containing Gases on the Performance of Molten Carbonate Fuel Cells", Interim Report EM-1699 prepared for Electric Power Research Institute by Institute of Gas Technology, February 1981; Sammels, A. F., Nicholson, S. B., and Ang. P. G. P., "Development of Sulfur-Tolerant Components for the Molten Carbonate Fuel Cells", J. Electrochem. Soc. 127, 350 (1980); and Claar, T. D., Marianowski, L. G., and Sammells, A. F., "Development of Sulfur-Tolerant Components for Second-Generation Molten Carbonate Fuel Cells", Interim Report EM-1114, prepared for the Electric Power Research Institute by Institute of Gas Technology, July 1969. A review of the effect of sulfur containing compounds on molten carbonate fuel cells is given in Marianowski, L. G., "An Update of the Sulfur Tolerance of Molten Carbonate Fuel Cells", paper presented at Third Annual Contaminant Control in Hot Coal Derived Gas Streams, Washington, Pa. May, 1983. The expense of using pure hydrogen gas fuels is high as is the expense of sufficient removal of sulfur containing contaminants to a level which maintains satisfactory fuel cell operation with many conventional anode materials.

U.S. Pat. No. 3,431,146 teaches a molten carbonate fuel cell having a fuel electrode of nickel, cobalt, or iron, exhibits at least a temporary increase in power output by addition of hydrogen sulfide to a hydrogen fuel gas. In specific examples, this patent teaches 2.0 volume percent hydrogen sulfide added to hydrogen fuel gas increased power output by 50 percent during a one minute flow of the added hydrogen sulfide.

U.S. Pat. No. 4,247,604 teaches molten carbonate fuel cell porous anodes including a chromium, zirconium, or aluminum surface area stabilizing agent to improve surface area stability of the porous anode during fuel cell operating conditions.

SUMMARY OF THE INVENTION

It is an object of this invention to provide a process for improved operation of molten carbonate fuel cells using fuel gas mixtures directly from naturally occurring carbonaceous material gasification, such as coal gasification.

It is another object of this invention to fuel cells using fuel gases having carbon monoxide content of about 10 to up to 35 volume percent.

It is yet another object of this invention to provide a process for operation of molten carbonate fuel cells in which a substantial portion of the carbon monoxide present in fuel gas mixtures is converted to additional hydrogen in the presence of up to about 10 ppm, on a volume basis, hydrogen sulfide.

It is still another object of this invention to provide porous metal anodes containing sulfur tolerant water-gas-shift catalyst and suitable for molten carbonate fuel cell operation.

These objects are achieved by using a porous nickel or cobalt anode incorporating about 0.5 to about 20 weight percent of a sulfur tolerant water-gas-shift catalyst to maintain a substantial conversion of carbon monoxide to additional hydrogen in the presence of up to about 10 ppm hydrogen sulfide in the fuel gas. Suitable water-gas-shift catalysts include $Cr_2O_3$, FeO, $Fe_2O_3$, $Fe_3O_4$, $Al_2O_3$, $LiAlO_2$, $LiCrO_2$, $MoO_2$, $MoO_3$, and $WO_3$.

DESCRIPTION OF PREFERRED EMBODIMENTS

The coal gasification/molten carbonate fuel cell power plant may provide higher energy conversion efficiencies and lower emissions of critical pollutants than conventional coal fired generating plants with the necessary stack gas scrubbing. However, the presence of very low concentrations of hydrogen sulfide in the fuel gas substantially reduces the performance of the fuel cell. The operating temperature of the molten carbonate fuel cell corresponds with the temperature of raw fuel gas produced by coal gasifiers. Such fuel gas typically contains hydrogen, carbon monoxide, variable amounts of methane and other hydrocarbons, and diluents such as carbon dioxide, water and nitrogen. The hydrogen present reacts in the molten carbonate fuel cell in accordance with the equation set forth above. Additionally, the carbon monoxide and reformable hydrocarbons in the fuel gas may also be converted into electricity. While these gases do not react electrochemically in the fuel cell, they may be transformed into additional hydrogen within the fuel cell, the carbon monoxide in the fuel gas being converted to hydrogen by the water-gas-shift reaction

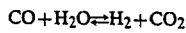

$$CO + H_2O \rightleftharpoons H_2 + CO_2$$

and the methane reformed by the steam according to the reaction:

$$CH_4 + 2H_2O \rightleftharpoons 4H_2 + CO_2$$

Thus, the molten carbonate fuel cell can convert a significant portion of the chemical energy content of many types of fuel gases into electricity by different in situ reactions within the molten carbonate fuel cell.

The conduct of the water-gas-shift reaction in the anode zone of a molten carbonate fuel cell is very important when using fuel gas derived from naturally occurring carbonaceous materials since up to 50 percent of the chemical energy content of a coal derived fuel gas may be in the form of carbon monoxide. When carbon monoxide containing fuels are used in a molten carbonate fuel cell, the conduct of the water-gas-shift reaction is necessary to maintain performance characteristics and the operating voltage of the fuel cell. It can be calculated using a typical low Btu coal derived fuel gas that at low fuel gas utilizations of less than 30 percent, the difference between a cell wherein the water-gas-shift reaction is at equilibrium as compared with a cell in which there is no water-gas-shift reaction, is less than 10 millivolts. However, as the fuel gas utilization approaches 64 percent, equivalent to 100 percent utilization of hydrogen and no utilization of carbon monoxide, the voltage of the cell in which the water-gas-shift reaction is poisoned, drops rapidly compared to the cell in which the water-gas-shift reaction continues at equilibrium. At 60 percent fuel gas utilization, the hydrogen in the anode exhaust from such a cell with no water-gas-shift reaction is 1.18 percent, while in the cell where the water-gas-shift reaction proceeds, the hydrogen content of the exhaust gas remains at 5.84 percent due to the additional hydrogen produced from the carbon monoxide present in the fuel gas mixture. These calculations are more fully explained in the publication "Effects of $H_2S$ on Molten Carbonate Fuel Cells" by Remick, R. J. and Anderson, G. L., work performed under contract No. DE-AC21-83MC 20212 by Institute of Gas Technology for U.S. Department of Energy, Office of Fossil Energy, January 1985. Conventionally used water-gas-shift catalysts have not been designed to operate at the operating temperatures of molten carbonate fuel cells.

We have found that molten carbonate fuel cells may be operated with substantial retention of the in situ water-gas-shift reaction continuing in the anode zone when about 0.5 to about 20 weight percent of a sulfur tolerant water-gas-shift catalyst selected from the group consisting of $Cr_2O_3$, FeO, $Fe_2O_3$, $Fe_3O_4$, $Al_2O_3$, $LiAlO_2$, $LiCrO_2$, $MoO_2$, $MoO_3$, and $WO_3$ and mixtures thereof, is incorporated on the active surface of a porous anode, the remainder being substantially a metal selected from the group consisting of nickel, cobalt and mixtures thereof. About 5 to 15 weight percent sulfur tolerant water-gas-shift catalyst is preferred. Preferred water-gas-shift catalyst materials include $Cr_2O_3$, $Al_2O_3$, $LiAlO_2$ and $LiCrO_2$ due to their known surface area stabilization in Ni and Co molten alkali metal carbonates fuel cell anodes. Another preferred catalyst material is FeO due to its potentially high water-gas-shift catalytic activity. The inventors are not aware of the prior use of molybdenum oxides or tungsten oxide in nickel or cobalt molten carbonate fuel cell anodes.

Use of the sulfur tolerant water-gas-shift catalyst in the active anode of a molten carbonate fuel cell according to this invention, provides substantial in situ conversion of carbon monoxide contained in fuel gas in amounts of generally from 10 to 35 volume percent to hydrogen, thereby providing additional hydrogen to the hydrogen content of the fuel gas to obtain cell voltages at sufficient operating levels. The process of molten carbonate fuel cell operation in accordance with this invention provides cell operation at below 700° C. and preferably about 500° to about 650° C. for conversion of a substantial amount of the carbon monoxide in the fuel gas to additional hydrogen. Generally, in excess of 25 volume percent and preferably in excess of 50 volume percent of the water-gas-shift reaction equilibrium production of additional hydrogen experienced with no hydrogen sulfide present, may be maintained when up to 5 to 10 ppm on a volume basis of hydrogen sulfide are present in the fuel gas. As hydrogen is consumed producing water vapor by the fuel cell electrochemistry, the water-gas-shift reaction which occurs on or within the anode itself may provide additional hydrogen for reaction so that with fuel comprising amounts of CO present in gases from coal gasification, up to 105 to 115 percent hydrogen utilization may be effected by the fuel cell.

While the conventional anode gas phase residence time in molten carbonate fuel cells is typically about 1 second, we find it desirable to increase the anode gas phase residence time to greater than 2 seconds and preferably the anode gas phase residence time is about 2 to about 4 seconds in the process of this invention to allow sufficient time for the water-gas-shift reaction to produce the desired additional hydrogen. The process of this invention provides the desired water-gas-shift reaction conversion of carbon monoxide to additional hydrogen in the anode zone when utilizing fuel gases having about 1 to about 10 and preferably about 1 to about 5 ppm by volume hydrogen sulfide.

Suitable anodes for use in the process of this invention may be prepared by the methods taught in U.S. Pat. No. 4,247,604, by known techniques utilizing tape casting layers followed by sintering, and by powdered metal techniques. The other fuel cell components and other operational processes taught by U.S. Pat. Nos. 4,009,321 and 4,247,604 are suitable for the fuel cells and processes contemplated by the present invention.

The following examples are set forth in specific detail for the purpose of illustrating the present invention and should not be considered to limit the invention.

EXAMPLE I

In a first series of tests, nickel powder was dispersed on quartz wool and in a second series, 90 percent nickel-10 percent chromium powder was dispersed on quartz wool. Both series were placed in a 1 inch diameter quartz tube and the catalytic activity of these powders toward the reverse shift reaction was determined at 650° C. using clean gas having the composition: 58 volume percent hydrogen, 39 volume percent carbon dioxide, and 3 volume percent water vapor (less than 1 ppb $H_2S$). The effect of 3 ppm $H_2S$ upon this catalytic activity was then determined by adding $H_2S$ to the gas stream entering the quartz tube. Results indicated that $H_2S$ present in quantities as low as 3 ppm completely poisons the pure nickel powder, but only partially poisons the nickel/chromium catalyst.

EXAMPLE II

An anode half of a fuel cell, complete with perforated nickel current collector, porous anode and an electrolyte carbonate containing lithium aluminate matrix was constructed of a stainless steel boiler plate housing a perforated nickel plate, a porous metal anode plaque 30 mils (0.076 cm) thick as specified below, and a 316 stainless steel top. The volume of gas channels in the anode housing and the perforations immediately behind the porous electrode plaque totaled 18.0 cm$^3$ The gas composition used was 58 percent hydrogen, 39 percent carbon dioxide, and 3 percent water vapor. This gas mixture was passed through the reactor at flow rates of 130 cc/min, 350 cc/min, 870 cc/min, and 1300 cc/min (measured at 25° C.) giving residence times of 2.6, 1.0, 0.38 and 0.26 second(s) at 650° C., respectively. The extent of the reverse shift reaction was determined by monitoring the concentration of carbon monoxide leaving the reactor. The reactor temperature was maintained at 650° C. throughout the experiment.

Anode Reactor with Porous 90 percent Ni-10 percent Cr Anode Plaque

The above described anode reactor was loaded with a porous 90 percent nickel-10 percent chromium anode plaque and heated to 650° C. under the above gas mixture. The reactor was allowed to stabilize for 100 hours on a clean gas, less than 1 ppb $H_2S$, flowing at 350 cc/min. The mole fraction of carbon monoxide on a dry basis was then determined using a Varian model Gas Chromatograph at the four different flow rates. The gas was before measurements were taken. After stable performance was achieved on clean gas (100 hours), a hydrogen sulfide permeation tube (Dynalab, Inc.) was added to the inlet stream. This permeation tube provided approximately 5 ppm of hydrogen sulfide contamination to the gas at the 350 cc/min cold flow rate (14 ppm at 130 cc/min, 2 ppm at 870 cc/min, and 1.3 ppm at 1300 cc/min).

Anode Reactor with Porous Nickel

The operation described above was repeated using a pure porous nickel plaque in place of the nickel/chromium. As before, the reactor was operated on clean gas for 100 hours to establish a baseline performance. The pure porous nickel proved to be a better catalyst for the reverse shift reaction than the nickel/chromium when clean sulfur free fuel was used. However, upon adding $H_2S$ contaminants to the gas stream, the porous nickel lost most of its catalytic activity for the reverse shift reaction in less than 50 hours.

The following table shows results of the carbon monoxide measurements in mole percent described in the above operation of the anode reactor. The theoretical carbon monoxide equilibrium concentration is 23 mole percent.

|  | Residence Time (Seconds) | | | |
| --- | --- | --- | --- | --- |
|  | 0.25 | 0.40 | 1.0 | 2.7 |
| Clean Gas |  |  |  |  |
| Ni Anode | 15.5 | 17.5 | 21.0 | 21.8 |
| NiCr Anode | 4.0 | 6.0 | 12.0 | 17.5 |
| $H_2S$ Contaminated Gas |  |  |  |  |
| Ni Anode | 0.8 | 1.0 | 2.5 | 3.5 |
| NiCr Anode | 1.5 | 2.5 | 6.0 | 10.0 |

EXAMPLE III

A bench scale molten carbonate fuel cell was operated on a medium Btu fuel gas mixture representative of the output of a coal gasifier. The anode was a 30 percent dense porous, 90 percent nickel, 10 percent chromium, sintered metal plaque, 0.076 cm thick and having a geometrical surface area of 94 cm$^2$ with a perforated nickel sheet anode collector. The cathode was a 50 percent dense lithiated nickel oxide plaque, 0.04 cm thick, with a geometrical surface area of 94 cm$^2$ and a performated 316 stainless steel sheet was used as a cathode current collector. The electrolyte was a 0.18 cm thick hot pressed matrix of 40 weight percent lithium aluminate as an inert support and 60 weight percent alkali carbonates electrolyte made up of 62 mole percent lithium carbonate and 38 mole percent potassium carbonate. The fuel used had the following wet analysis:
34 percent hydrogen
23 percent water vapor
13 percent carbon monoxide
18 percent carbon dioxide
12 percent nitrogen and the following dry analysis:
44 percent hydrogen
17 percent carbon monoxide
23 percent carbon dioxide
16 percent nitrogen
Fuel was supplied to the anode chamber at a flow rate of 350 cc/min on a dry basis at 20° C. The oxidant used had the following wet analysis:
24 percent carbon dioxide
12 percent oxygen
44 percent nitrogen
20 percent water vapor
and the following dry analysis:
30 percent carbon dioxide
14.7 percent oxygen
55.3 percent nitrogen
Oxidant was supplied to the cathode chamber at a flow rate of 970 cc/min on a dry basis at 20° C. The fuel cell was operated at 200 mA/cm$^2$ average current density. At the average current density and fuel flow rate used, 75 percent of the heating value of the fuel must be used to maintain the required current density. Such operating conditions require at least 3 percent of the carbon monoxide present in the fuel to be shifted to hydrogen. Calculation at water-gas-shift equilibrium shows the cell should have 5.3 volume percent (dry basis) carbon monoxide in the anode exhaust if the water-gas-shift reaction is at equilibrium and if the water-gas-shift reaction is totally poisoned 17.7 volume percent (dry basis) carbon monoxide. The carbon monoxide content of the spent fuel in the anode exhaust was determined by a Perkin-Elmer gas chromatograph with a TC detector.

The cell was operated using clean fuel gas, less than 1 ppb hydrogen sulfide for 284 hours. After about 100 hours operation, the carbon monoxide in the anode exhaust averaged about 5.3 volume percent (dry basis) and the cell voltage averaged 670 mV. Five parts per million, on a volume basis, hydrogen sulfide was added to the fuel gas between hour 284 and hour 384 resulting in rapid increase in carbon monoxide in the anode exhaust to an average of about 10.4 volume percent (dry basis) and the cell voltage fell to about 510 mV. This demonstrates retention of catalytic activity for the water-gas-shift reaction to almost 60 percent of its equilibrium value. Operation of the fuel gas was continued from 284 hours to 624 hours with clean gas and the carbon monoxide in the anode exhaust decreased to an average of about 6 volume percent (dry basis) and the cell voltage increased to about 650 mV.

EXAMPLE IV

The same molten carbonate fuel cell described in Example III except a porous pure nickel anode was substituted for the anode used in Example III, was operated under the same conditions and procedures. The cell was operated using clean fuel gas for 200 hours. In a few hours operation, the carbon monoxide in the anode exhaust averaged about 10 which decreased to about 7.7 volume percent (dry basis) after 150 hours and the cell voltage averaged about 700 mV. Five ppm hydrogen sulfide was added to the fuel gas between hour 200 and hour 300 resulting in rapid increase in carbon monoxide in the anode exhaust to an average of about 12 volume percent (dry basis) and the cell voltage fell to about 600 mV. This demonstrates retention of catalytic activity for the water-gas-shift reaction of less than 46 percent of its equilibrium value. Operation of the fuel gas was continued from 300 hours to 400 hours with clean gas and the carbon monoxide in the anode exhaust decreased to an average of about 9 volume percent and the cell voltage increased to about 650–700 mV.

The Examples demonstrate 60 percent retention of the water-gas-shift reaction when using a porous anode having a composition of 90 weight percent nickel and 10 weight percent chromium according to this invention in the presence of 5 ppm hydrogen sulfide. This magnitude of retention of the water-gas-shift reaction is satisfactory for use of fuel gases containing about 10 to about 35 volume percent carbon monoxide.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a process for production of electricity in a molten alkali metal carbonates fuel cell using a fuel gas mixture obtained by gasification of naturally occurring carbonaceous material, the improvement comprising passing said fuel gas mixture comprising about 10 to about 35 volume percent CO and about 1 ppm to about 10 ppm H$_2$S on a volume basis through a porous anode comprising about 0.5 to about 20 weight percent of a sulfur tolerant water-gas-shift catalyst selected from the group consisting of Cr$_2$O$_3$, FeO, Fe$_2$O$_3$, Fe$_3$O$_4$, Al$_2$O$_3$, LiAlO$_2$, LiCrO$_2$, MoO$_2$, MoO$_3$, WO$_3$, and mixtures thereof and the remainder being substantially a metal selected from the group consisting of nickel, cobalt, and mixtures thereof whereby over about 25 volume percent of the water-gas-shift equilibrium conversion of CO to H$_2$ obtained with no H$_2$S present is maintained in the presence of said H$_2$S.

2. The process of claim 1 wherein said catalyst is present in about 5 to about 15 weight percent.

3. The process of claim 2 wherein said anode comprises about 85 to 95 weight percent of a metal selected from the group consisting of nickel, cobalt, and mixtures thereof.

4. The process of claim 2 wherein said anode comprises about 85 to 95 weight percent nickel.

5. The process of claim 1 wherein said anode comprises about 80 to 99.5 weight percent of a metal selected from the group consisting of nickel, cobalt, and mixtures thereof.

6. The process of claim 1 wherein said anode comprises about 80 to 99.5 weight percent nickel.

7. The process of claim 1 wherein said fuel cell is operated below about 700° C.

8. The process of claim 1 wherein said fuel cell is operated at about 500° to about 650° C.

9. The process of claim 1 wherein over about 50 volume percent of the water-gas-shift equilibrium conversion of CO to H$_2$ obtained with no H$_2$S present is maintained in the presence of said H$_2$S.

10. The process of claim 1 wherein said gas has a residence time in the zone of said anode for greater than about 2 seconds.

11. The process of claim 1 wherein said gas has a residence time in the zone of said anode of about 2 to about 4 seconds.

12. The process of claim 1 wherein said fuel gas comprises about 1 to about 5 ppm by volume $H_2S$.

13. The process of claim 1 wherein said catalyst is present in about 5 to about 15 weight percent, said anode comprises about 85 to 95 weight percent nickel, said fuel cell is operated at about 500° to about 650° C., and said gas has a residence time in the zone of said anode for greater than about 2 seconds.

14. The process of claim 1 wherein said catalyst is present in about 5 to about 15 weight percent, said anode comprises about 85 to 95 weight percent nickel, said fuel cell is operated at about 500° to about 650° C., said gas has a residence time in the zone of said anode of about 2 to about 4 seconds, and said fuel gas comprises about 1 to about 5 ppm by volume $H_2S$.

15. In a process for production of electricity in a molten alkali metal carbonates fuel cell having a porous sulfur tolerant catalytic anode having improved fuel cell electrical output under carbonate fuel cell operating conditions when using a fuel gas mixture comprising about 10 to about 35 volume percent CO and about 1 to about 10 ppm $H_2S$ on a volume basis, said process comprising passing said fuel gas mixture through said sulfur tolerant catalytic anode comprising about 0.5 to about 20 weight percent of a sulfur tolerant water-gas-shift catalyst selected from the group consisting of $MoO_2$, $MoO_3$, $WO_3$, and mixtures thereof and the remainder being substantially a metal selected from the group consisting of nickel, cobalt and mixtures thereof, said anode being electrochemically active and said water-gas-shift catalyst being at catalytically effective temperatures of about 500° C. to about 700° C. whereby over about 25 volume percent of the water-gas-shift conversion of CO to $H_2$ obtained with no $H_2S$ present is maintained in the presence of said $H_2S$.

16. In a process of claim 15 wherein said catalyst is present in about 5 to about 15 weight percent.

17. In a process of claim 15 wherein said anode comprises about 80 to 99.5 weight percent cobalt.

18. In a process of claim 15 wherein said anode comprises about 85 to 95 weight percent nickel.

19. In a process of claim 15 wherein said catalyst is selected from the group consisting of $MoO_2$ and $MoO_3$.

20. In a process of claim 15 wherein said catalyst is $WO_3$.

* * * * *